H. W. BODENDIECK.
WHEEL FENDER FOR CAR TRUCKS.
APPLICATION FILED FEB. 3, 1908.
913,192.
Patented Feb. 23, 1909.
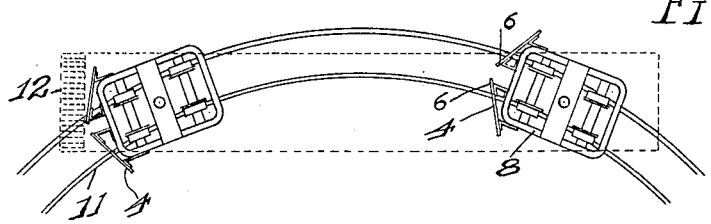
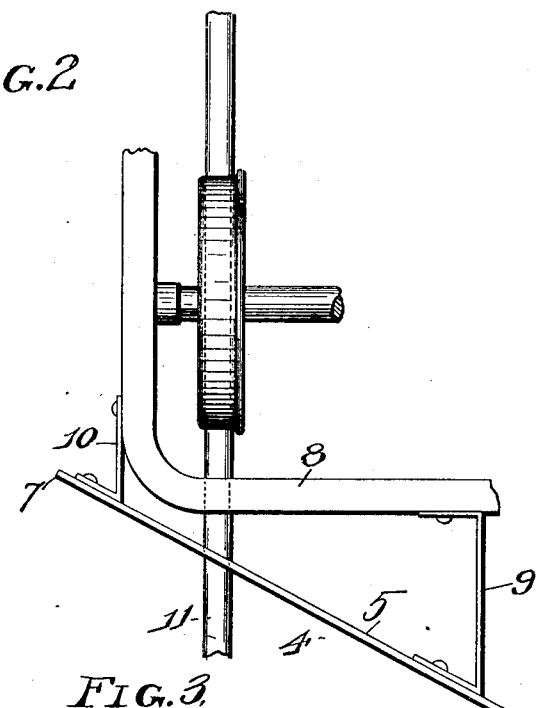
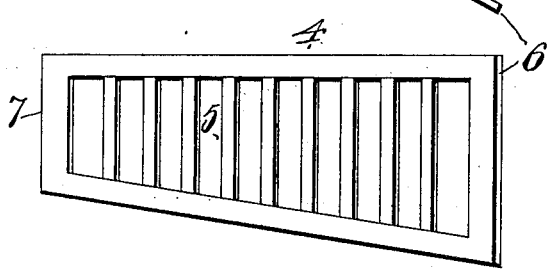
Witnesses
W. C. Stein
Inventor
Henry W. Bodendieck
by Hopkins & Eicks Attys

UNITED STATES PATENT OFFICE.

HENRY W. BODENDIECK, OF ST. LOUIS, MISSOURI.

WHEEL-FENDER FOR CAR-TRUCKS.

No. 913,192.  Specification of Letters Patent.  Patented Feb. 23, 1909.

Application filed February 3, 1908. Serial No. 414,126.

*To all whom it may concern:*

Be it known that I, HENRY W. BODENDIECK, a citizen of the United States, and resident of St. Louis, Missouri, have invented certain new and useful Improvements in Wheel-Fenders for Car-Trucks, of which the following is a specification.

This invention relates to improvements in wheel fenders for car trucks, and consists in the novel arrangement construction and combination of parts as will be fully hereinafter described and claimed.

The object of my invention is to equip the truck frame with a suitable guard or fender of sufficient length and arranged at a proper angle, so as to prevent any object from coming in contact with the wheels of the truck, especially while making a curve.

A further object is to use in connection with the ordinary car fender carried by the car body, a suitable wheel guard, so as to deflect any object from the rail, especially when the car is making a curve.

Figure 1 is a top plan view of a track curve, with the trucks of the car in position, and the car body shown in dotted lines. Fig. 2 is a top plan view of my invention, showing it attached to a portion of the truck frame. Fig. 3 is a front view of my improved guard or fender.

In the construction of my invention, I provide a guard or fender 4, preferably constructed of a grille 5, the inner end indicated by the numeral 6, being of greater height than the outer end 7. The grille 5 is held in position upon the truck frame 8 by suitable brackets 9 and 10, which are so arranged as to support the grille at an angle and at all times above the rail 11, whether the truck is running on the straight track or on a curve.

I show in Fig. 1 a curve with a pair of trucks in relative position thereon, the body of the car shown in dots to indicate the relative position, the car body assumes while making a curve. The car fender 12, which is ordinarily carried by the car body, projects beyond the track, leaving one of the rails unprotected. By placing my improved wheel guard in the position as shown, should an object fall on the unprotected rail, the guard will have a tendency to remove it and prevent the same from coming in contact with the truck wheel.

Having fully described my invention what I claim is:

A wheel guard for car trucks and the like, comprising in combination with a truck-frame a grille or guard member carried by the truck-frame; brackets rigidly secured to said truck-frame and guard member, the outer end of said grille member being spaced relatively nearer the truck-frame, the inner end of said guard member being of greater height than the outer end, substantially as shown and described and for the purpose set forth.

In testimony whereof, I have signed my name to this specification, in presence of two subscribing witnesses.

HENRY W. BODENDIECK.

Witnesses:
 ALFRED A. EICKS,
 WALTER C. STEIN.